United States Patent
Hosokawa et al.

(10) Patent No.: US 7,811,392 B2
(45) Date of Patent: Oct. 12, 2010

(54) SUPPRESSION METHOD OF RADIONUCLIDE DEPOSITION ON REACTOR COMPONENT OF NUCLEAR POWER PLANT AND FERRITE FILM FORMATION APPARATUS

(75) Inventors: Hideyuki Hosokawa, Hitachinaka (JP); Makoto Nagase, Mito (JP); Kazushige Ishida, Hitachi (JP); Youichi Wada, Hitachinaka (JP); Naoshi Usui, Tsuchiura (JP); Motohiro Aizawa, Hitachi (JP); Motomasa Fuse, Hitachinaka (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 490 days.

(21) Appl. No.: 11/485,984

(22) Filed: Jul. 14, 2006

(65) Prior Publication Data

US 2007/0127619 A1    Jun. 7, 2007

(30) Foreign Application Priority Data

Jul. 14, 2005    (JP)    ............................. 2005-206017

(51) Int. Cl.
    *C23C 8/40*    (2006.01)
    *G21C 9/00*    (2006.01)
(52) U.S. Cl. ...................... 148/287; 148/276; 148/277; 148/284; 376/305; 376/306; 376/310
(58) Field of Classification Search ................. 148/276, 148/277, 284, 287; 376/305, 306, 310
    See application file for complete search history.

(56) References Cited

U.S. PATENT DOCUMENTS

| 4,508,641 A | * | 4/1985 | Hanulik ......................... 588/3 |
| 4,828,790 A | * | 5/1989 | Honda et al. ................. 376/306 |
| 5,154,197 A | * | 10/1992 | Auld et al. ...................... 134/1 |
| 2006/0067455 A1 | * | 3/2006 | Hosokawa et al. ........... 376/310 |

FOREIGN PATENT DOCUMENTS

| JP | A-58-079196 | | 12/1983 |
| JP | A-62-095498 | | 1/1987 |
| JP | B-63-015990 | | 7/1988 |
| JP | 09-113690 | * | 5/1997 |
| JP | 2000-121791 | * | 4/2000 |
| JP | A-2006-038483 | | 9/2006 |

* cited by examiner

*Primary Examiner*—George Wyszomierski
*Assistant Examiner*—Lois Zheng
(74) *Attorney, Agent, or Firm*—Mattingly & Malur, P.C.

(57) ABSTRACT

It is an object of the present invention to efficiently suppress radionuclide deposition on a reactor component of nuclear power plant. Radionuclide deposition on the surface of a metallic reactor component of nuclear power plant is suppressed by forming a ferrite film on the component, wherein the film is formed, after decontamination for removing radionuclides contaminants from the component surface is completed and before the plant is started up, by contacting a treatment solution which mixes a first agent containing the iron (II) ions, a second agent for oxidizing the iron (II) ions into the iron (III) ions and a third agent for adjusting pH level of a solution to 5.5 to 9.0 in this order with the reactor component surface.

23 Claims, 12 Drawing Sheets

A: STAINLESS STEEL SURFACE-TREATED BY MECHANICAL GRINDING
B: STAINLESS STEEL FORMED AN OXIDE FILM AT A BWR OPERATING TEMPERATURE
C: STAINLESS STEEL FORMED A MAGNETITE FILM

SUPPRESSION METHOD OF RADIONUCLIDE DEPOSITION ON REACTOR COMPONENT OF NUCLEAR POWER PLANT AND FERRITE FILM FORMATION APPARATUS

FIELD OF THE INVENTION

The present invention relates to a suppression method of radionuclide deposition on a reactor component of nuclear plant, e.g. power plant, and ferrite film formation apparatus therefor.

BACKGROUND OF THE INVENTION

A boiling reactor water (hereinafter referred to as BWR) type nuclear power plant compulsorily circulates cooling water by a recycling pump or an internal pump in the reactor which contains fuel rods in a pressure vessel in order to efficiently transfer heat generated in fuels to cooling water. The cooling water vapor generated in the reactor is mostly used to drive a steam turbine for power generation. The vapor which is discharged from the turbine is condensed by a condenser, and the condensate is almost completely degassed to be recycled back to the reactor as cooling water. The almost completely degassing removes oxygen and hydrogen produced by radiolysis of water in the reactor core. The condensate is treated, before being recycled back to the reactor, by using an ion-exchanging resin filter, e.g. desalter, so as to mainly remove metallic impurities to suppress formation of radioactive corrosion products in the reactor and heated to around 200° C.

Since the radioactive corrosion products occur at the portions where the pressure vessel, recycling system and the like contact with the reactor water, the corrosion-resistant stainless steel or the impermeable steel, e.g. nickel-based alloy, is used for the major reactor components in the primary system. Moreover, the reactor pressure vessel, which is made of a low-alloy steel, is treated with the weld overlay of stainless steel in order to prevent the low-alloy steel from coming into direct contact with the reactor water. In addition to these material considerations, one part of the reactor water is cleaned by a reactor water cleaning unit to positively remove metallic impurities present in water of which the concentration is very low.

However, the presence of metallic impurities in reactor water is unavoidable, and one part of these impurities will be deposited in the form of metal oxides on the fuel rod surfaces. The metals deposited on the rod surfaces are subjected to nuclear reactions by the irradiation of neutrons from the fuels to become radionuclides, e.g. cobalt 60 or 58, chromium 51, or manganese 54. Most of these radionuclides remain deposited on the rod surfaces in the form of oxides. However, one part of them is eluted into cooling water while depending on the solubility of the oxide in which they are included, or re-released into the reactor water as the insoluble solid which is referred to as crud. The radioactive substances present in the reactor water are removed by a cleaning system. However, the unremoved ones will be deposited on the portions where the recycling system component contacts with the reactor water while the reactor water is circulating in the systems, e.g. recycling system. As a result, the radioactive ray may be radiated from the contaminated surfaces to cause radiation exposure of operators when conducting the regular inspection. A radiation dose to which operators may be exposed is controlled for individual operators not to exceed a stipulated level. This level was reduced to the lower level recently, and thus it is necessary to economically minimize the exposed dose of each operator as far as possible.

Therefore, the various measures have been studied to control deposition of radionuclides on piping systems and to reduce radionuclide concentrations in reactor water. For example, Patent Document 1 proposes to inject metallic ion, e.g., zinc ion, into reactor water to form a densely, zinc-containing oxide film on the surfaces of the pipes in contact with the reactor water in a recycling system to prevent radionuclides, e.g, cobalt 60 or 58, from entering the film. Patent Document 2 proposes to coat the inner of the pipes in the recycling and cleaning systems, through which the reactor water flows while the plant is in service, with the oxide film under the certain conditions before cooling water is contaminated with the eluted or the released radionuclides.

Patent Document 1: JP-A-58-79196

Patent Document 2: JP-A-62-95498

However, injection of a metallic ion, e.g. zinc ion as disclosed by Patent Document 1, involves problems that the continuous injection of the ion is required while the plant is in service, and also the use of zinc obtained by isotopic separation is required in order to avoid radioactivation of zinc itself.

With reference to the method for coating the surfaces of the pipes with the oxide film, as disclosed by Patent Document 2, the inventors have found that there exist the following problems resulting from formation of the film at BWR operating temperature (250 to 300° C.). In short, the inventors of the present invention have found, when a reactor component of stainless steel is to be coated, that a Cr-rich inner layer of the oxide film is first formed on the surface and then an outer layer of the oxide film containing Cr with the lower content is formed. And the inventors have found that this two-layers structure has little effect of suppressing the radionuclide deposition, because radioactive cobalt 60 or 58 easily enters the inner layer of the oxide film.

Other objects, features and advantages of the invention will become apparent from the following description of the embodiments of the invention taken in conjunction with the accompanying drawings.

BRIEF SUMMARY OF THE INVENTION

It is an object of the present invention to efficiently suppress radionuclide deposition on the reactor component of nuclear power plant.

DESCRIPTION OF REFERENCE NUMERALS

Figure 1:
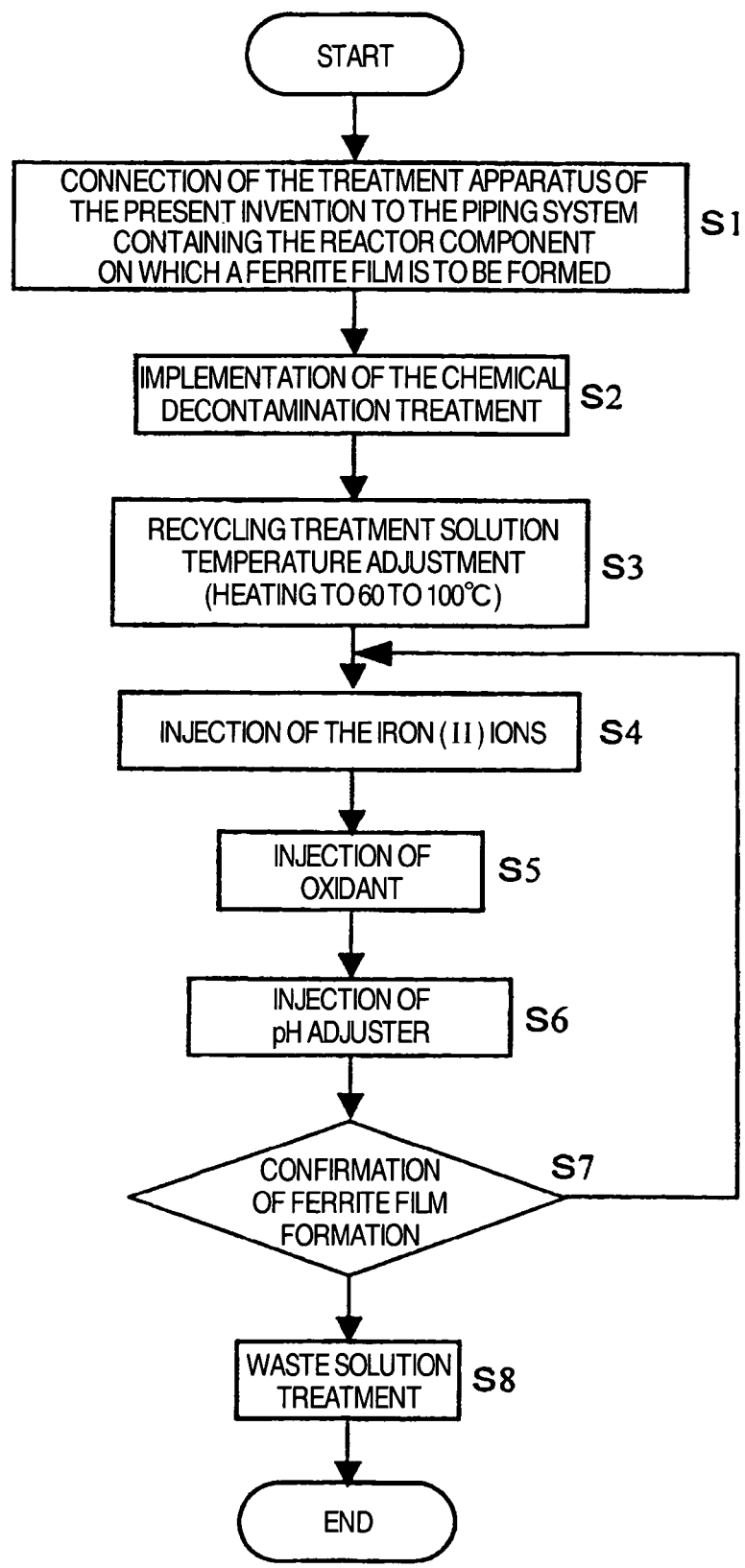
FIG. 1 illustrates a flow chart showing one embodiment of the suppression method of the radionuclide deposition of the present invention.

1 Pressure vessel of nuclear reactor
2 Main steam line
3 Turbine
4 Condenser
5 Condensate pump
6 Condensate cleaning unit
7 Water supply pump
8, 9 Supplied water heater
10 Water supply line
11 Nuclear reactor containment vessel
21 Recycling pump
22 Recycling line
28, 29 Plug
30 Ferrite film formation apparatus
31 Surge tank
32, 48 Circulation pump
35 Treatment solution line
37 Ejector
39, 43, 44 Injection pump
40, 45, 46 Agent tank
51 Filter
53 Heater
58 Cooler
60 Cation-exchanging resin tower
62 Mixed-bed deionization tower
64 Decomposition unit
81 Electrolysis tank
82 Iron plate
83 DC current source
84 Carbon dioxide gas supply unit
86 Ion chromatographic analyzer for measuring iron (II) ion concentration

DESCRIPTION OF THE INVENTION

The inventors of the present invention have found, as a result of having extensively studied to solve the above problems, that the contamination of a reactor component with cobalt of radionuclide can be suppressed when a dense film only consisting of ferrite (e.g. magnetite) is formed under the condition of temperature at which the diffusion of the dissolved oxygen into the metal base is slow (e.g. 100° C. or lower).

Figure 2:
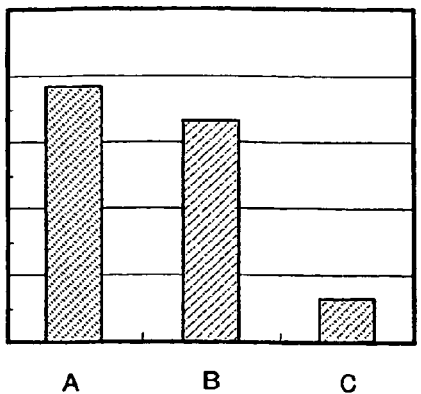
FIG. 2 shows the relative quantities of Co-60 deposited on the stainless steel samples surface-treated by various methods, when immersed in water which is kept at a high temperature for the BWR operation.

More specifically, a stainless steel reactor component which forms a magnetite film is immersed in water kept at a high temperature for BWR operation to investigate the deposited quantity of Co-60. The formed film can remarkably suppress the radionuclide deposition, as shown in FIG. 2 which plots relative quantities of Co-60 deposited on the surface-treated stainless steel samples A, B and C. Samples A, B, C show the sample which mechanically grinds the surface on the stainless stell, the sample which forms the oxide film at a BWR operating temperature, and the sample which forms the magnetite film at 100° C. or lower, respectively. It is apparent, as shown in FIG. 2, that deposition of Co is much more efficiently suppressed on Sample C of the magnetite film than on Samples A and B. The magnetite film may be formed by the prior art for forming a ferrite film as a magnetic recording medium (e.g. that disclosed by JP-B-63-15990). It should be noted, however, that this prior art uses chlorine which is inapplicable to this invention for the purpose of keeping integrity of the reactor components. Therefore, the different method must be used for suppressing nuclide deposition.

The inventors of the present invention have found, as a result of having extensively studied to solve the above problems, that the surface of the metallic reactor component can form a ferrite film which can suppress radionuclide deposition thereon without using chlorine if the iron (II) ions on the surface of the reactor component is adsorbed by using an organic acid instead of chlorine and the adsorbed iron (II) ion is oxidized, at 20 to 200° C., (preferably 20 to 100° C., more preferably 60 to 100° C.), thereby achieving the present invention.

The present invention includes the following aspects:

(1) A method for suppressing radionuclide deposition on a metallic reactor component of nuclear power plant, including the steps of adsorbing iron (II) ions on the surface of the reactor component, oxidizing the adsorbed iron (II) ions at 20-200° C., and forming a ferrite film on the surface of the metallic component.

(2) A method for suppressing rationuclide deposition on a metallic reactor component of nuclear power plant according to (1), including the steps of contacting a first agent containing the iron (II) ions, a second agent for oxidizing the iron (II) ions to iron (III) ions and a third agent for adjusting pH level to 5.5-9.0 with the surface of the metallic reactor component, either individually or by mixture, in the form of a treatment solution; and forming the ferrite film thereon at 20-200° C.

(3) A method for suppressing radionuclide deposition on a metallic reactor component of nuclear power plant according to (2), wherein the treatment solution is prepared by mixing the first agent, the second agent and the third agent in this order.

(4) A method for suppressing radionuclide deposition on a metallic reactor component of nuclear power plant according to (2) or (3), wherein the third agent is mixed in a nuclear reactor containment vessel.

(5) A method for suppressing radionuclide deposition on a metallic reactor component of nuclear power plant according to any one of (2) to (4), wherein the first agent is an aqueous formic acid solution dissolving metallic iron.

(6) A method for suppressing radionuclide deposition on a metallic reactor component of nuclear power plant according to any one of (2) to (5), wherein the first agent is an aqueous formic acid solution dissolving iron (II) formate.

(7) A method for suppressing radionuclide deposition on a metallic reactor component of nuclear power plant according to any one of (2) to (4), wherein the first agent is a solution containing the iron (II) ion eluted from a metallic iron electrode by electrolysis.

(8) A method for suppressing radionuclide deposition on a metallic reactor component of nuclear power plant according to any one of (2) to (7), wherein the second agent is hydrogen peroxide.

(9) A method for suppressing radionuclide deposition on a metallic reactor component of nuclear power plant according to any one of (2) to (8), wherein the third agent is hydrazine.

(10) A method for suppressing radionuclide deposition on a metallic reactor component of nuclear power plant according to any one of (2) to (9), wherein the ratio of hydrogen peroxide concentration in the second agent to the iron (II) ion concentration in the first agent is ¼ or less.

(11) A method for suppressing radionuclide deposition on a metallic reactor component of nuclear power plant according to any one of (2) to (10), wherein the first agent and the treatment solution bubbled with an inert gas are used.

(12) A method for suppressing radionuclide deposition on a metallic reactor component of nuclear power plant according to any one of (2) to (11), wherein the metallic reactor component is supplied with the treatment solution by a 2-line system, each line being alternately carried out in a fill-and-drain manner to form the ferrite film.

(13) A method for suppressing radionuclide deposition on a metallic reactor component of nuclear power plant according to any one of (2) to (12), wherein the ferrite film is formed while particulate substances floating in the treatment solution are removed by filtration.

(14) A method for suppressing radionuclide deposition on a metallic reactor component of nuclear power plant according to any one of (1) to (13), wherein the ferrite film is formed after radionuclide contaminants which include an oxide film deposited on the metallic reactor component, are removed.

(15) A method for suppressing radionuclide deposition on a metallic reactor component of nuclear power plant according to (14), wherein the radionuclide contaminants are removed by chemical decontamination which repeats oxidation and reduction alternately.

(16) A method for suppressing radionuclide deposition on a metallic reactor component of nuclear power plant according to any one of (1)-(15), wherein the ferrite film is formed at 60-100° C.

(17) A method for suppressing radionuclide deposition on a metallic reactor component of nuclear power plant according to any one of (1) to (16), wherein the ferrite film is formed after the decontamination step for removing the radionuclides contaminants from the metallic reactor component is completed and before the nuclear plant is started up.

(18) A method for suppressing radionuclide deposition on a metallic reactor component of nuclear power plant according to any one of (1) to (17), wherein a vapor phase is purged with an inert gas when a free liquid surface is present on the reactor component on which the ferrite film is to be formed.

(19) A method for suppressing radionuclide deposition on a metallic reactor component of nuclear power plant according to any one of (1) to (18), wherein the agent components are decomposed into a substance present in the form of gas at normal temperature and pressure or water after any one of the ferrite films described in (1) to (18) is formed.

(20) A method for suppressing radionuclide deposition on a metallic reactor component of nuclear power plant according to (19), wherein any one of ferrite films described in (1) to (18) is formed after the agent components are decomposed into the substance present in the form of gas at normal temperature or water.

(21) A ferrite film formation apparatus for forming a ferrite film on a metallic reactor component of nuclear power plant, including:

(a) a surge tank for holding a treatment solution, (b) a circulation pump for introducing the treatment solution from the surge tank, (c) a first agent tank for holding a first agent containing iron (II) ions, (d) a second agent tank for holding a second agent for oxidizing the iron (II) ions to the iron (III) ions, (e) a third agent tank for holding a third agent for adjusting pH of a treatment solution to 5.5-9.0, (f) a supply pipe for mixing the treatment solution introduced by the circulation pump with the agents sent from the first tank, the second tank and the third tank, and supplying the mixture solution to a piping system on which the ferrite film is to be formed, (g) a return line for sending the treatment solution, which is sent back from the piping system on which the ferrite film is to be formed, back to the surge tank, and (h) a heating means for keeping the treatment solution at 60-100° C., wherein an injection port of the third agent is located in a nuclear reactor containment vessel.

(22) A ferrite film formation apparatus for forming a ferrite film on a metallic reactor component of nuclear power plant according to (21) including an analyzer which can measure at least one of pH of the treatment solution, iron (II) ion concentration in the treatment and solution and electrochemical potential of platinum electrode in the treatment solution.

(23) A metallic reactor component of nuclear power plant including a ferrite film formed on the surface of the metallic reactor component by adsorbing iron (II) ions on the surface of the metallic reactor component, oxidizing the ion (II) at 20-200° C., and adjusting pH to 5.5 to 9.0.

(24) A metallic reactor component of nuclear power plant according to (23), including a treatment solution containing a first agent containing the iron (II) ions, a second agent for oxidizing the iron (II) ions to the iron (III) ions and a third agent for adjusting pH of the treatment solution to 5.5-9.0 wherein the treatment solution is contacted with the metallic reactor component to form the ferrite film thereon at 20-200° C.

(25) A metallic reactor component of nuclear power plant according to (24), wherein the treatment solution is mixed with the first agent the second agent and the third agent in this order.

The "metallic reactor component of nuclear power plant" used in this specification means any metallic reactor component which comes into contact with the reactor water which contains the radionuclide generated in a nuclear reactor. These components include, for example, the components constituting the reactor water recycling system and the cleaning system, but not limited to them. It applies to a metallic component which comes into contact with the reactor water in a BWR plant as well as in a pressurized reactor water (PWR) type plant. These components are mostly made of stainless steel.

Moreover, the "normal temperature" and "normal pressure" mean 20° C. and 1 atm, respectively.

The method of the present invention includes the steps of adsorbing iron (II) ions on the surface of the metallic reactor component of nuclear power plant and oxidizing the iron (II) ions at temperature of normal temperature to 200° C., preferably 60 to 100° C. to form the ferrite film on the surface of the metallic reactor component.

The method of the present invention typically forms the ferrite film on the metallic reactor component of nuclear power plant at normal temperature to 200° C. (preferably 60 to 100° C.) by contacting a mixed treatment solution of the first agent containing the iron (II) ions, the second agent for oxidizing the iron (II) ions to the iron (III) ions and the third agent for adjusting pH of the treatment solution pH to 5.5 to 9.0 with the surface of the metallic reactor component. The treatment solution is preferably prepared by mixing the first agent, the second agent and the third agent in this order.

First Agent

Figure 3:
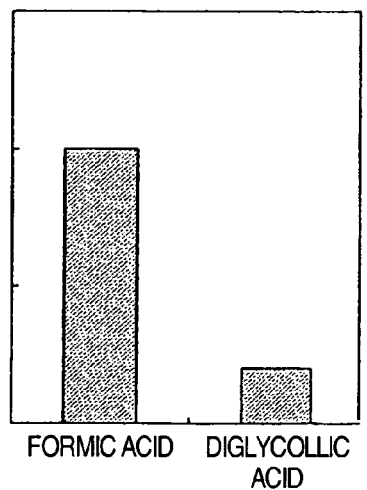
FIG. 3 shows the relationship between the relative quantities of the formed ferrite films and various organic iron (II).

The first agent containing the iron (II) ions is not limited so long as it is of a compound containing the iron (II) ions or an aqueous solution thereof. For example, the first agent may be of an aqueous solution a salt composed of iron and organic or inorganic acid. Organic acid and carboxylic acid are particularly preferable because they can be decomposed into carbon dioxide and water after they are used for forming the ferrite film. Organic acid include, for example, formic acid, malonic acid, diglycollic acid and oxalic acid. An aqueous solution of iron (II) formate is more preferable for the first agent, in terms of the quantity of the formed ferrite film and the uniformity thereof. FIG. 3 shows relative quantities of the ferrite film which is formed when iron (II) formate or iron (II) diglycollate is used.

The first agent may be an aqueous solution containing the iron (II) ion eluted from a metallic iron electrode in an electrolysis system.

Second Agent

The second agent may be an oxidant or an aqueous solution thereof which can oxidize the iron (II) ions to the iron (III) ions.

When the ferrite film is formed using a solution containing the iron (II) ions, it is first necessary to partly oxidize the iron (II) ions to the iron (III) ions. Oxidants include, for example, hydrogen peroxide.

Figure 5:
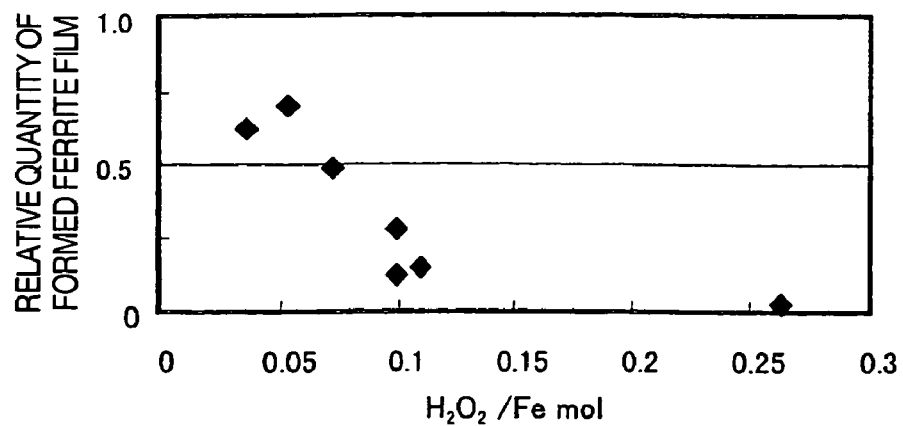
FIG. 5 shows the relationship between the molar hydrogen peroxide/iron ratio and relative quantity of the formed ferrite film formed.

When the iron (III) ions is formed by oxidizing the iron (II) ions in the presence of an excessive quantity of the iron (III) ions, the ferrite film cannot be sufficiently formed, and iron (III) hydroxide ($Fe(OH)_3$) is deposited. It is, therefore, preferable to use the oxidant in a quantity not to deposit iron (III) hydroxide ($Fe(OH)_3$). The relationship between the oxidant concentration/iron (II) ion concentration ratio and quantity of the ferrite film formed was investigated. The results are given in FIG. 5. This shows that the ferrite film is little formed when the oxidant concentration/iron (II) ion concentration ratio exceeds ¼. Therefore, it is preferable to keep the ratio of ¼ (0.25) or less, more preferably 0.15 or less.

Third Agent

The method of the present invention uses a treatment solution (preferably aqueous solution) containing the first agent and second agent. pH of the solution is preferably adjusted to a specific range. Therefore, the present invention uses a pH adjuster or an aqueous solution thereof as a third agent, thereby adjusting pH of the solution to 5.5 to 9.0. The pH adjuster includes, for example, decomposable substances such as hydrazine, but is not limited to it.

Formation of the Ferrite Film on the Surface of the Metallic Reactor Component

The present invention uses the first agent, the second agent and the third agent to form a ferrite film on the surface of the metallic reactor component of nuclear power plant.

The first, second and third agents can be contacted with a metallic reactor component either individually or by mixture in the form of a mixed solution (i.e. treatment solution).

The treatment solution containing the first, second and third agents, when used, is preferably prepared (mixtured) immediately before it is used to treat a metallic reactor component because formation of the fine ferrite particles occurs as soon as these agents are mixed.

Figure 4:
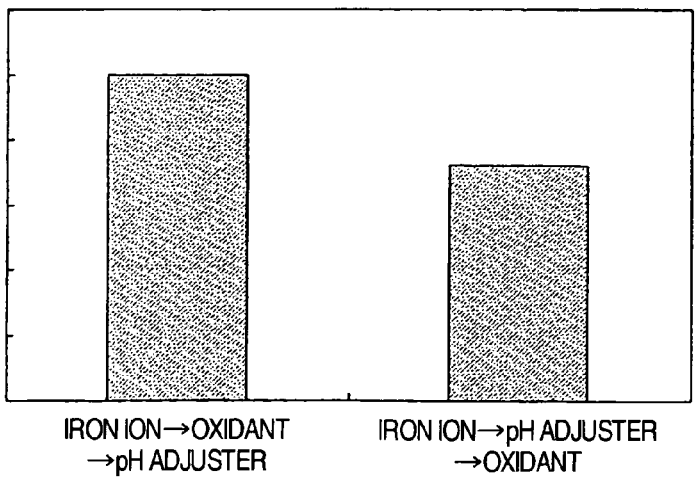
FIG. 4 shows the relationship between the relative quantity of the formed ferrite film and order of incorporation of agents.

Also, the inventors have found that the formability of the ferrite film and the denseness thereof depend on the order to mix the first, second and third agents. The results of the tests conducted by the inventors of the present invention indicate that the ferrite film formed by using the treatment solution mixed with the first, second and third agents in this order exhibits the better film formability (see FIG. 4) and is the uniform and dense film. It is particularly preferable to add and mix the third agent as a pH adjuster in the nuclear reactor containment vessel.

It is preferable to bubble the first agent and the treatment solution with an inert gas, e.g. nitrogen or argon, and thus to previously remove oxygen from the aqueous solution.

For example, the method of the present invention can be carried out by a ferrite film formation apparatus which comprises:

(a) a surge tank for holding a treatment solution, (b) a circulation pump for introducing the treatment solution from the surge tank, (c) a first agent tank for holding a first agent containing iron (II) ions, (d) a second agent tank for holding a second agent for oxidizing the iron (II) ions to the iron (III) ions, (e) a third agent tank for holding a third agent for adjusting pH of a treatment solution to 5.5 to 9.0, (f) a supply pipe for mixing the treatment solution introduced by the circulation pump with the agents sent from the first tank, the second tank and the third tank, and supplying the mixture solution to a piping system on which the film is to be formed, (g) a return line for sending the treatment solution, which is sent back from the piping system on which the ferrite film is to be formed, back to the surge tank, and (h) a heating means for keeping the treatment solution at 60 to 100° C., wherein an injection port of the third agent is located in a nuclear reactor containment vessel.

The positions at which the first agent (containing the iron (II) ions), the second agent (oxidant) and third agent (pH adjuster) are injected into the recycling system are set up in this order along the flow direction. It is particularly preferable to inject the third agent immediately before a reactor component to be treated. Such an arrangement of the injection positions can prevent the ferrite film from wastefully being formed on other components.

The treatment solution is sent from the ferrite film formation apparatus to a metallic reactor component on which a ferrite film is to be formed through a supply pipe.

When the metallic reactor component is supplied with the treatment solution by a 2 line system, each line may be alternately carried out in a fill and drain manner to form a ferrite film on the surface of the metallic reactor component in both systems.

Particulate substances such as fine solid particles, when floating in the treatment solution, may allow for the formation of the film thereon while the ferrite film is formed on the surface of the metallic reactor component. Therefore, a filter is preferably provided in the recycling line to remove the particulate substances, in order to prevent the wasteful consumption of the agents.

The oxide film contaminated by including a radionuclide which occurs while the reactor is in service may be formed on the surface of the metallic reactor component. Therefore, it is preferable to remove the contaminants including the radionuclides, e.g. oxide film, before the surface of the metallic reactor component is coated with the ferrite film. The decontamination treatment to remove the oxide film may be a mechanical treatment, e.g. a grinding treatment, or a chemical treatment, of the component surface with an oxidant and reductant. When there is a free liquid surface (e.g. vapor phase) in the treatment solution line, it is preferable to purge a vapor phase with an inert gas, e.g. nitrogen or argon, to prevent oxidation of the solution. Subsequent to the decontamination treatment, the treatment to form the ferrite film is carried out before the nuclear plant is started up.

After the ferrite film is formated, the agents used are preferably decomposed partly or totally into a substance present in the form of gas at normal temperature and pressure and/or water. This treatment is preferably followed by treatment for forming the ferrite film in a manner described above.

EXAMPLES

The present invention is described in more detail by Examples and attached drawings, but these do not limit the present invention.

Example 1

Figure 6:
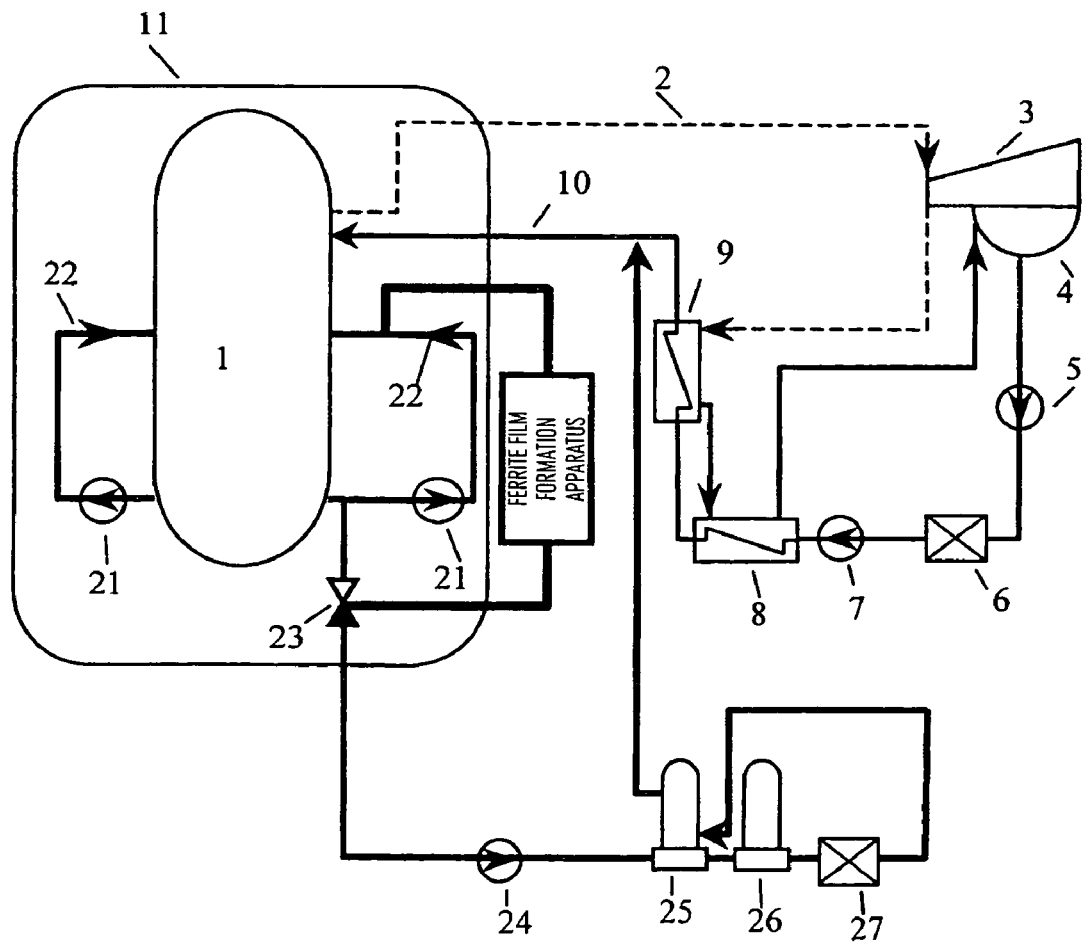
FIG. 6 illustrates an overall system structure of Example 1.
Figure 7:
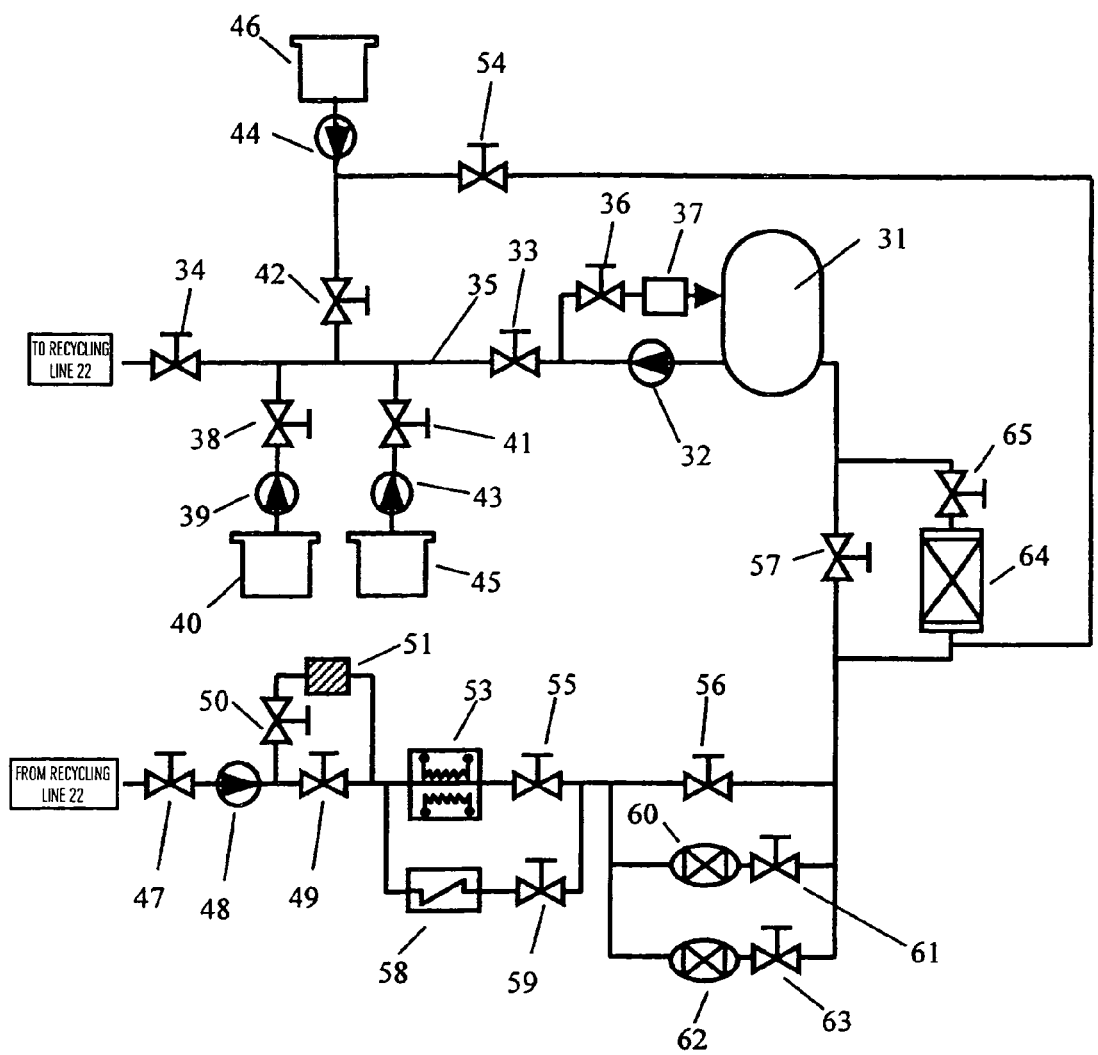
FIG. 7 illustrates the detailed ferrite film formation apparatus structure of Example 1.

FIG. 6 illustrates an overall nuclear power plant structure, in which the ferrite film formation apparatus of the present invention is connected to the reactor water recycling line, and FIG. 7 illustrates the detailed ferrite film formation apparatus structure.

FIG. 6 illustrates the case in which the ferrite film formation apparatus 30 of the present invention is provided in a reactor water recycling line system. As illustrated in FIG. 6, the nuclear power plant has a structure with the nuclear reactor 1 which contains fuel rods in a pressure vessel, a main steam line 2 connected to the reactor 1, a steam turbine power generator 3 connected to the main steam line 2, and condenser connected to the steam turbine power generator 3 at the steam exhaust port. The condensate formed in a condenser 4 is drained by a condensate pump 5 to be recycled back as supplied water to the reactor 1 by a water supply piping system 10 provided with a condensate cleaning unit 6, a water supply pump 7, a low-pressure supplied water heater 8 and a high-pressure supplied water heater 9. Steam extracted from the steam turbine power generator 3 serves as the heat source for the low-pressure supplied water heater 8 and the high-pressure supplied water heater 9.

A plurality of the reactor water recycling systems are provided for circulating cooling water in the nuclear reactor 1, where reactor water drained by a plurality of a recycling pumps 21 connected to the reactor 1 at the bottom is recycled back to the reactor 1 at the top via a reactor water recycling line 22. The reactor water cleaning system for cleaning the reactor water from the reactor 1 is structured to cool the reactor water, which is drained by a cleaning system pump 24 connected to the reactor water recycling line 22, by a regenerative heat exchanger 25 and a nonregenerative heat exchanger 26; clean the cooled reactor water by a reactor water cleaning unit 27; heat the cleaned reactor water by the regenerative heat exchanger 25; and recycle it back to the nuclear reactor 1 from the downstream of the high-pressure supplied water heater 9.

A ferrite film formation apparatus 30 can be connected to the nuclear reactor 1 in the following manner. The reactor 1 is stopped, and then the reactor water cleaning unit 27 side is closed after the bonnet of a valve 23 in the reactor water cleaning system line branched from the reactor water recycling line 22 is opened. Then, the ferrite film formation apparatus 30 is connected by a temporary line to the upstream side of the recycling pump 21 in the reactor water recycling line 22 via the valve 23 flange. At the same time, the other side of the apparatus 30 which is connected by another temporary line, is connected to the downstream side of the recycling pumps 21. In short, these units are connected by lines in such a way that part of the reactor water from the reactor water recycling line 22 passes through the ferrite film formation apparatus 30 and is recycled back to the line 22.

FIG. 7 illustrates one embodiment of the ferrite film formation apparatus 30. In this embodiment, the apparatus 30 is also structured to be used for chemical decontamination. A surge tank 31 which holds water (treatment solution) for forming a ferrite film is connected to one side of the reactor water recycling line 22 via the circulation pump 32, valves 33 and 34 and so forth.

The treatment solution line 35 is connected to agent tanks 45 and 46 via a valve 41 and an injection pump 43, or a valve 42 and an injection pump 44. The agent tank 45 on the upstream side holds a first agent containing the iron (II) ions, e.g. an aqueous solution containing the divalent iron (II) ions prepared by dissolving iron in formic acid. The agent tank 46 on the downstream side holds a second agent (oxidant, e.g. hydrogen peroxide). An agent tank 40 which holds a third agent (pH adjuster, e.g. hydrazine) in the downstream side of the agent tank 46 is connected to the treatment solution line 35.

The ferrite film formation apparatus 30 may be structured to have a return line, via a valve 36 and an ejector 37, back to the surge tank 31 to inject an agent for chemically decontaminating the continuations in the pipes (e.g. permanganic acid for oxidative dissolution and oxalic acid for reductive dissolution) from the ejector 37 into the tank 31.

The treatment solution which is sent to one side of the reactor water recycling line 22 by the circulation pump 32 is again sent from the other side of the line 22 back to the ferrite film formation apparatus 30 via a valve 47. The treatment solution is then sent back to the surge tank 31 via a circulation pump 48, a valve 49, a heater 53, and valves 55, 56 and 57.

The valve 49 is parallel connected to a valve 50 and a filter 51. The filter 51 is used for capturing particulate substances which float in the treatment solution. It is preferable to keep the valve 50 open while a ferrite film is formed in order to allow the filter 51 to pass water.

The heater 53 and valve 55 are parallel connected to the cooler 58 and valve 59.

The valve 56 is parallel connected to the cation-exchanging resin via tower 60 and valve 61, and to the mixed-bed deionization tower 62 via valve 63.

The valve 57 is parallel connected to the decomposition unit 64 via valve 65. The decomposition unit 64 is connected to the discharge side of the injection pump 44 which is connected to the agent tank 46 via the valve 54. The system is thus structured to inject hydrogen peroxide solution which is held in the agent tank 46 into the decomposition unit 64. The first and third agents can be decomposed by the unit 64 into the substances present in the form of gas at normal temperature and pressure and water when an organic acid or carboxylic acid is used as an counter anion to the iron (II) ions for the first agent, and a compound, e.g. hydrazine, is used as a pH adjuster for the third agent. Wastes can be reduced by partly or totally decomposing the first and third agents into water and carbon dioxide or a releasable compound in the decomposition unit 64. Moreover, it is preferable to recover and reuse the unreacted agent in order to reduce agent consumption.

In this example, the oxidant necessary for forming the ferrite film is the same compound of hydrogen peroxide as that necessary for decomposition, and the agent tank and injection pump are shared for these purposes to minimize facility requirements. However, they may be separately set up depending on the situations, e.g. situation that a long pipe is needed.

The valve 42 for injecting a second agent (oxidant) is positioned downstream of the valve 41 for a first agent (containing the iron (II) ion) and upstream of the valve 38 for a third agent (pH adjuster), which is preferably positioned as close to a reactor component to be treated as possible, preferably in a nuclear reactor containment vessel.

Moreover, it is preferable that the agent tank 45 and the surge tank 31 are designed such that the solution held therein can be bubbled with an inert gas, e.g. nitrogen or argon.

Next, the method for suppressing radionuclide deposition using the ferrite film formation apparatus of the present invention is described by referring to the flow chart shown in FIG. 1.

Step S1 (Installation of the Ferrite Film Formation Apparatus)

The ferrite film formation apparatus 30 is connected to the piping system including a reactor component to be treated when the method of the present invention is carried out. For example, referring to FIG. 8, when a metallic reactor component in the reactor water recycling system is to be treated, the reactor water recycling line 22 is disconnected from the reactor 1 by the plugs 28 and 29 after the reactor 1 is stopped, and further the ferrite film formation apparatus 30 is connected via the valves 12 and 13 branched from the line 22. Some components of the ferrite film formation apparatus 30 shown in detail in FIG. 7 are omitted in FIG. 8.

Step S2 (Decontamination Treatment)

This embodiment adopts chemical decontamination using the ferrite film formation apparatus 30 to remove the contaminants including radionuclides, e.g. radionuclide-containing oxide film formed on the surface of the metallic reactor component in contact with reactor water. In the method for suppressing radionuclide deposition of the present invention the application of the chemical decontamination is preferable. However, in the case of exposing the surface of the metallic component surface to be treated without the contaminated oxide film is exposed, the chemical decomposition is not necessarily needed. Moreover, the chemical decontamination may be replaced by the mechanical decontamination treatment, e.g. grinding.

The chemical decontamination is well known, and may be carried out in the following manner. The circulation pumps 32 and 48 are started, after the valves 33, 34, 47, 49, 55, 56 and 57 are opened with the other valves kept closed, to circulate the treatment solution from the surge tank 31 in the reactor water recycling system 22 subjected to the chemical decontamination. Then, the treatment solution is heated to about 90° C. by the heater 53. Then, the valve 36 is opened to inject a necessary quantity of the oxidant (e.g. potassium permanganate) and/or the reductant (e.g. oxalic acid) into the surge tank 31 from a hopper which is set up on the ejector 37. The solution in the surge tank 31 is sent to the reactor component to be decontamination-treated and thus the contaminants including the radionuclides, e.g. the contaminated oxide film, can be removed from the component surface by oxidative dissolution and/or reductive dissolution. More specifically, the contaminants including the radionuclides are oxidized and dissolved in potassium permanganate to be removed. Then, oxalic acid is injected from the hopper into the surge tank 31 to decompose the permanganate ion remaining in the treatment solution by the following reaction.

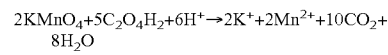

$$2KMnO_4 + 5C_2O_4H_2 + 6H^+ \rightarrow 2K^+ + 2Mn^{2+} + 10CO_2 + 8H_2O$$

Then, oxalic acid is injected into the treatment solution for reductive/dissolution of the contaminants and a pH adjuster (e.g., hydrazine) held in the agent tank 40 is simultaneously injected into the solution, after the valve 38 is opened. A series of these treatment steps elute the metal cation into the treated solution, and the metal cation is removed by the cation-exchanging resin tower 60.

After the chemical decontamination treatment is carried out, one part of the treatment solution is sent to the decomposition unit 64 to decompose oxalic acid remaining in the solution. The valve 54 is opened to simultaneously send a second reagent (oxidant, e.g. hydrogen peroxide solution) which is held in the agent tank 46 to the unit 64 in order to decompose oxalic acid and hydrazine by the following reactions.

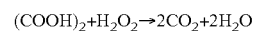

$$(COOH)_2 + H_2O_2 \rightarrow 2CO_2 + 2H_2O$$

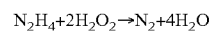

$$N_2H_4 + 2H_2O_2 \rightarrow N_2 + 4H_2O$$

After the decomposition of oxalic acid and hydrazine, the heater 53 is stopped and the valve 55 is closed for the purpose of removing impurities from the treatment solution. At the same time, the treatment solution is passed through the cooler 58 after the valve 59 is opened, and the solution is cooled. After the temperature of the treated solution is reduced to the temperature (e.g. 60° C.) at which the treated solution can be passed through the mixed-bed deionization tower 62, the valve 61 on the cation-exchanging resin tower 60 side is closed and the valve 63 on the tower 62 side is opened to send the solution to the tower 62 for the removal of impurities.

A series of the above treatment steps, i.e. the heating, the oxidative dissolution of the contaminants, the decomposition of the oxidant, the reductive dissolution of the contaminants, the decomposition of the reductant and the cleaning operation (the contaminant and impurity removal), can dissolve and remove the contaminants including the contaminated oxide film deposited on the surface of the metallic reactor component when repeated 2 to 3 times. The final cleaning operation as the decontamination step is preferably carried out to clean the treatment solution by reducing concentrations of the decontamination agents, metallic ions and so forth to an extent that the solution is acceptable by a radioactive material handling system.

Step S3 (Heating of Treatment Solution)

After the decontamination step, the treatment solution is heated. The valve 49 is closed and the valve 50 is opened to start passing the solution through the filter 51. Fine solid particles, when remaining in the treatment solution, may allow for formation of a film thereon while the ferrite film on the surface of the reactor component is formed. Therefore, the filter 51 is used in the recycling line to remove them to prevent the wasteful consumption of the agents. The filtration is not recommended during Step S2 because the filter 51 may capture highly radioactive solids so as to have an excessively high dose rate.

The temperature of the treatment solution is adjusted to a specific temperature (normal temperature to 200° C., preferably 60° C. to 100° C.) by the heater 53. The valve 56 is opened and the valve 63 is closed to stop passing the solution through the mixed-bed ionization tower 62. Temperature of the treatment solution is not limited so long as it allows for forming the sufficiently dense ferrite film to reject radionuclides. It is preferably 200° C. or lower. It may be normal temperature as the lower limit, but preferably 60° C. or higher in consideration of the formation rate of the ferrite film. It is more preferably 100° C. or lower because the system need to be pressurized to prevent boiling of the treatment solution when it exceeds 100° C. and increase the system cost in order to satisfy the pressure resistance requirements although the method of the present invention can be carried out.

Step S4 (Addition of First Agent (Containing the Iron (II) Ions) to Treatment Solution)

It is necessary to adsorb the iron (II) ions on the reactor component surface to be treated, in order to form a ferrite film thereon. The iron (II) ions present in the solution are oxidized into the iron (III) ions by dissolved oxygen, and the iron (III) ions are deposited in the form of iron hydroxide according by the following reactions.

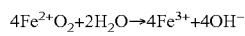

$4Fe^{2+} + O_2 + 2H_2O \rightarrow 4Fe^{3+} + 4OH^-$

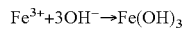

$Fe^{3+} + 3OH^- \rightarrow Fe(OH)_3$

However, iron hydroxide has no contribution to ferrite film formation, and it is preferable to remove the dissolved oxygen present in the first agent solution and the treatment solution as far as possible. It can be removed by an adequate procedure, e.g. the bubbling with an inert gas (e.g. nitrogen or argon) or the degassing under a vacuum.

When the circulated treatment solution reaches a specific temperature, the first agent (e.g., formic acid containing the iron (II) ions) held in the first agent tank 45 is added to the treatment solution after the valve 41 is opened.

Step S5 (Addition of Second Agent (Oxidant) to Treatment Solution)

Then, an oxidant (e.g. hydrogen peroxide solution) held in the agent tank 46 is added to the treatment solution, after the valve 42 is opened, to convert the iron (II) ions adsorbed on the surface of the metallic reactor component to a ferrite.

Step S6 (Addition of Third Agent (pH Adjuster) to Treatment Solution)

Finally, a pH adjuster (e.g. hydrazine) held in the agent tank 40 is added to the treatment solution, after the valve 38 is opened, to adjust pH of the treatment solution to 5.5 to 9.0. The treatment solution containing all of the first, second and third agents is contacted with the metallic reactor component to be treated to form a ferrite film (e.g. magnetite film) thereon.

Figure 9:
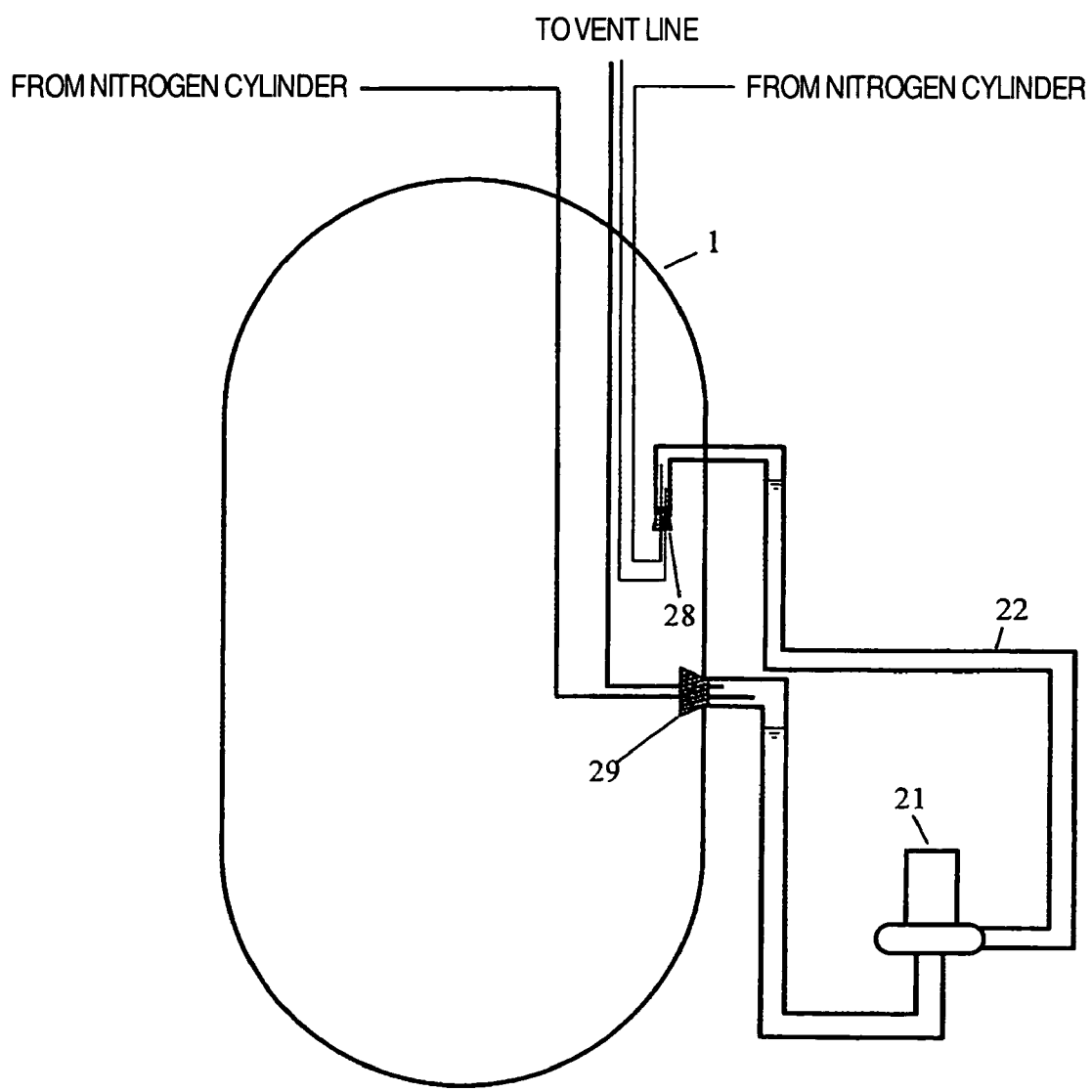
FIG. 9 illustrates the system structure of Example 1, in which a vapor phase in the upper part of the recycling line is purged with nitrogen.

Steps S4, S5 and S6 are preferably carried out continuously. In other words, it is preferable that injection of the second agent is started as soon as the first agent reaches the point at which the second agent is injected, and injection of the third agent is started as soon as the second agent reaches the point at which the third agent is injected. When the first agent is only injected and circulated in the system, it is oxidized at a high probability by the dissolved oxygen remaining in the system, thereby leading to loss of the agent and the reactions necessary for forming a ferrite film being retarded by unnecessary reactions. It is therefore preferable not only to bubble the solutions held in the agent tank 22 and surge tank 31 but also to purge a vapor phase present in the recycling line 22 to form a free liquid surface, with an inert gas (e.g. nitrogen gas) by using an inert gas supply line which is connected to the plugs 28 and 29 and vent line, as shown in FIG. 9.

Oxidation of the iron (II) ions start when the first agent is added to the second agent. When the ratio of oxidant (e.g. hydrogen peroxide) concentration in the second agent to iron (II) ion concentration in the first agent is ¼ (0.25) or less, preferably 0.15 or less, the conditions suit to form the ferrite film are provided. In this case, however, the treatment solution forms little ferrite film because it is acidic. It is therefore necessary to keep the solution about neutral with a pH adjuster. The reaction for the formation of the ferrite film starts as soon as the pH adjuster is added. Therefore, the injection point of the third agent (pH adjuster) is located immediately before the reactor component to be treated in the containment vessel 11 (i.e. on the side of upstream), as illustrated in FIG. 8, in order to prevent the ferrite film from being wastefully formed on other components.

The first, second and third agents are preferably added in this order. The order of the second, first and third agents is also acceptable. However, this order is not recommended because hydrogen peroxide will be readily decomposed on a metallic surface at a high temperature and one part of hydrogen peroxide will be wastefully consumed when it is firstly injected. The order of the first, third and second agents can form a ferrite film. However, the size of the particles constituting the ferrite film increases. Therefore, the order of the first, second and third agents is preferable to efficiently use the agents and form a denser ferrite film.

Figure 8:
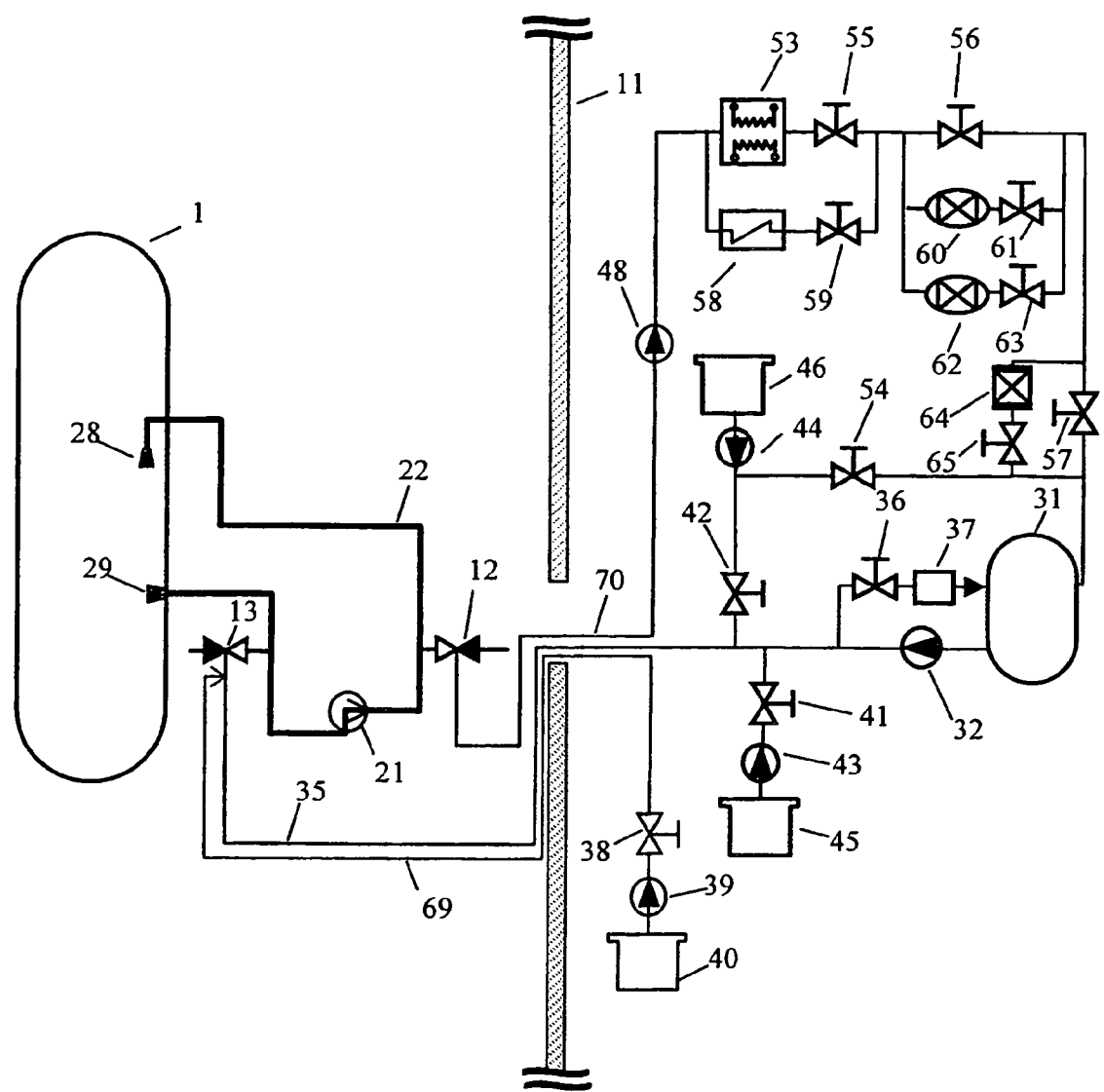
FIG. 8 illustrates the system structure of Example 1, in which a third agent is injected in a nuclear reactor containment vessel.

In the system illustrated in FIG. 8, a free liquid surface is formed at 2 points in the recycling line 22. It is necessary to control liquid level of the treatment solution in order to prevent the solution from entering the pressure vessel 1. It is, however, preferably kept as high as possible to keep dose rate low in a dry well. The liquid level can be controlled by sensitively manipulating the valves 33 and 49 (see FIG. 7) to balance flow rates by the circulation pump 32 and the circulation pump 48. The ferrite film tends to be easily formed in the vicinity of vapor/liquid interface, and it is possible to efficiently form the ferrite film on a riser tube located over the recycling line 22 by controlling the liquid level.

Step S7 (Confirmation of Ferrite Film Formation)

When the formation of the ferrite film is confirmed to be sufficient, Step S7 is followed by Step S8 (waste solution treatment).

When not, the procedure is returned back to Step S4, and a series of the steps of forming the ferrite film are repeated until the film attains the target thickness. In this case, the first, second or third agent may be further added, as required.

Step S8 (Waste Solution Treatment)

The first and third agents (e.g. formic acid for the former and hydrazine for the latter) will remain in the treatment solution after it is used for forming a ferrite film, and thus the treatment of the waste solution in Step 8 is preferably carried out to decompose these compounds before discarding the solution. The solution may be treated in the ion-exchanging resin tower 60. However, this increases the resin wastes. It is therefore preferable to decompose them by using the decomposition unit 64. This decomposes formic acid into carbon dioxide and water, and hydrazine into nitrogen and water by the following reactions.

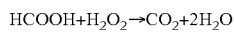

$$HCOOH + H_2O_2 \rightarrow CO_2 + 2H_2O$$

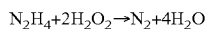

$$N_2H_4 + 2H_2O_2 \rightarrow N_2 + 4H_2O$$

The decomposition of these compounds by using the decomposition unit 64 can reduce the load at the ion-exchanging resin tower 60 and the amount of resin wastes. The decomposition treatment can be carried out by introducing hydrogen peroxide in the treatment solution which flows into the decomposition unit 64 in a way similar to the decomposition of oxalic acid.

As described above, the method of the present invention can form the dense ferrite film on the reactor component to suppress radionuclides deposition, (e.g. radioactive cobalt ion) thereon during the normal operation of a nuclear reactor. As a result, it can reduce radiation exposure of operators during the regular inspection by reducing the dose rate in the reactor water recycling system. It can also reduce radioactive wastes deposited on an ion-exchanging resin. Moreover, it uses no agent harmful to reactor components, e.g. chlorine, when forming the ferrite film, and thus the integrity of these components can be kept intact.

Example 2

Figure 10:
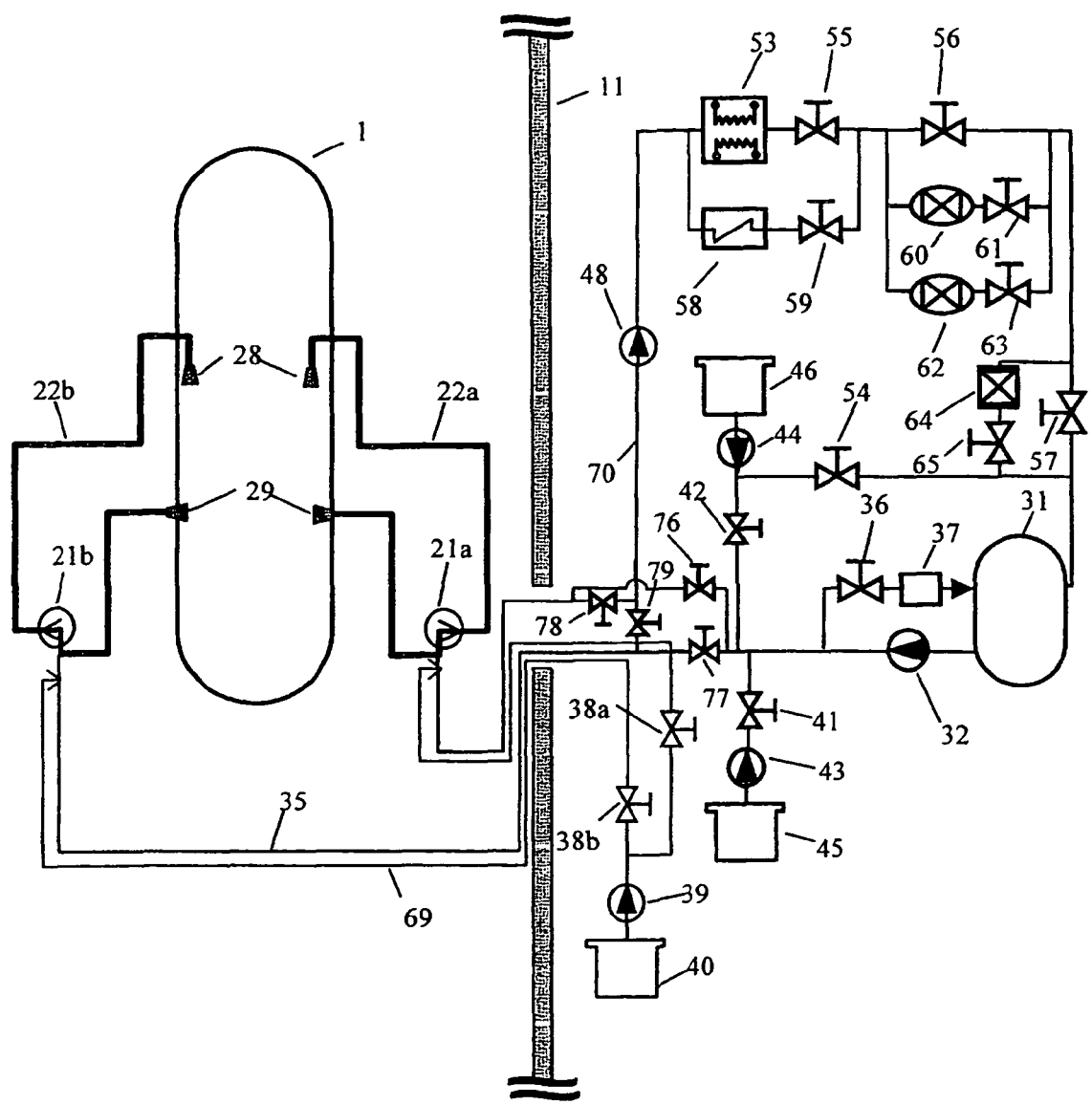
FIG. 10 illustrates an overall system structure of Example 2.

FIG. 10 illustrates a system schematic with 2 recycling lines 22.

The ferrite film formation apparatus 30 is basically the same as that shown in FIGS. 8 and 7, except that a valve for switching the flow path is added so that the treatment solution can flow in both recycling lines 22.

This system has basically the same work flow with respect to the chemical decontamination and the formation of the ferrite film as that shown in FIG. 1, except that the treatment solution is alternately transferred to the 2 recycling lines 22 (hereinafter "Line A" and "Line B", respectively) in the following manner so that these lines can be simultaneously treated for the formation of the ferrite film.

In the apparatus of Example 1 (see FIG. 8), the ferrite film formation apparatus 30 and recycling line 22 are connected to each other by 2 lines. In the system of Example 2 (see FIG. 10), on the other hand, the ferrite film formation apparatus 30 is connected, by one line, to each of Lines A and B. It is preferable to connect the line from the ferrite film formation apparatus 30 at the lowest point of the recycling line 22 in consideration of drainage or the like. This structure needs 2 points for injecting the third agent (pH adjuster) so as to inject the agent immediately before the recycling lines 22. Accordingly, the system of the Example needs 2 injection lines extending from the third agent tank for holding a pH adjuster to the inside of the nuclear reactor containment vessel 11, and these lines are constructed to be selected by using values.

The work procedure is illustrated by an example more specifically. First, water (treatment solution) is sent to Line A (22a) and ferrite film formation apparatus 30 to have a sufficient liquid level for decontamination. Water which is held in Line A can be transferred to Line B (22b) when the circulation pumps 32 and 48 are started with the valves 77 and 78 kept open and the valves 76 and 79 kept closed. The treatment solution is heated by the heater 53 while being transferred. After water which is held in Line A is totally transferred to Line B, the valves 77 and 78 are closed and valves 76 and 79 are opened. This starts the transfer of water which is held in Line B to Line A. When forming a ferrite film, the opening and closing of the valves 38a and 38b are controlled in such a way to inject the third agent (pH adjuster) to the line to which the treatment solution is sent.

In example 2, the chemical decontamination and the formation of the ferrite film can be carried out in the same manner as in Example 1, except that the valves are operated to control flow of the treatment solution.

The above procedure allows the 2 recycling lines 22 to simultaneously form the ferrite film. The valves concerned are preferably operated automatically.

The procedure in Example 2 has more time to provide vapor-liquid interfaces in more portions on the surface of the recycling line 22 due to the movement of the treatment solution while it is injected and discharged. This facilitates the uniform formation of the ferrite film. Also, since it operates to fill the line with a certain quantity of the solution, the risk that the highest liquid level exceeds a setting level is reduced and hence the possibility that the treated solution spills into a nuclear reactor by an operational mistake can be reduced.

Example 3

Figure 11:
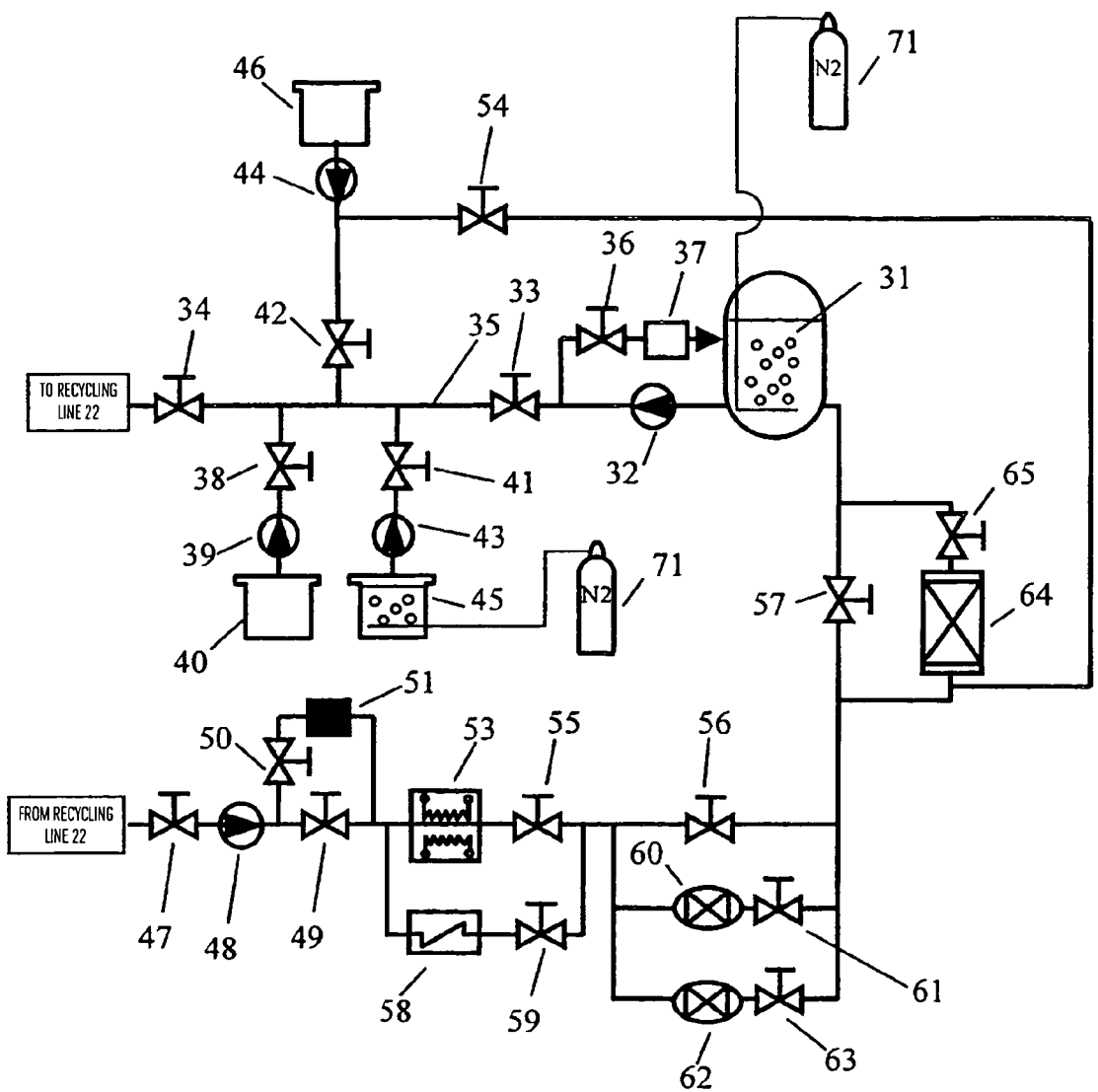
FIG. 11 illustrates the ferrite film formation apparatus structure of Example 3.

FIG. 11 illustrates a system schematic of Example 3. The system of the embodiment of Example 3 has basically the same devices and their arrangement as that of the embodiment of Example 1 illustrated in FIG. 7, except that it has the bubbling unit 71 for bubbling the treatment solution in the surge tank 31 and the first agent in the agent tank 45 with an inert gas (e.g. nitrogen).

Bubbling the first agent and the treatment solution in the surge tank with an inert gas removes the dissolved oxygen from each solution, thereby making them essentially oxygen-free. This accelerates the ferrite film forming reactions by suppressing formation of the iron (III) ions in each solution which has no contribution to ferrite film formation.

Example 4

Figure 12:
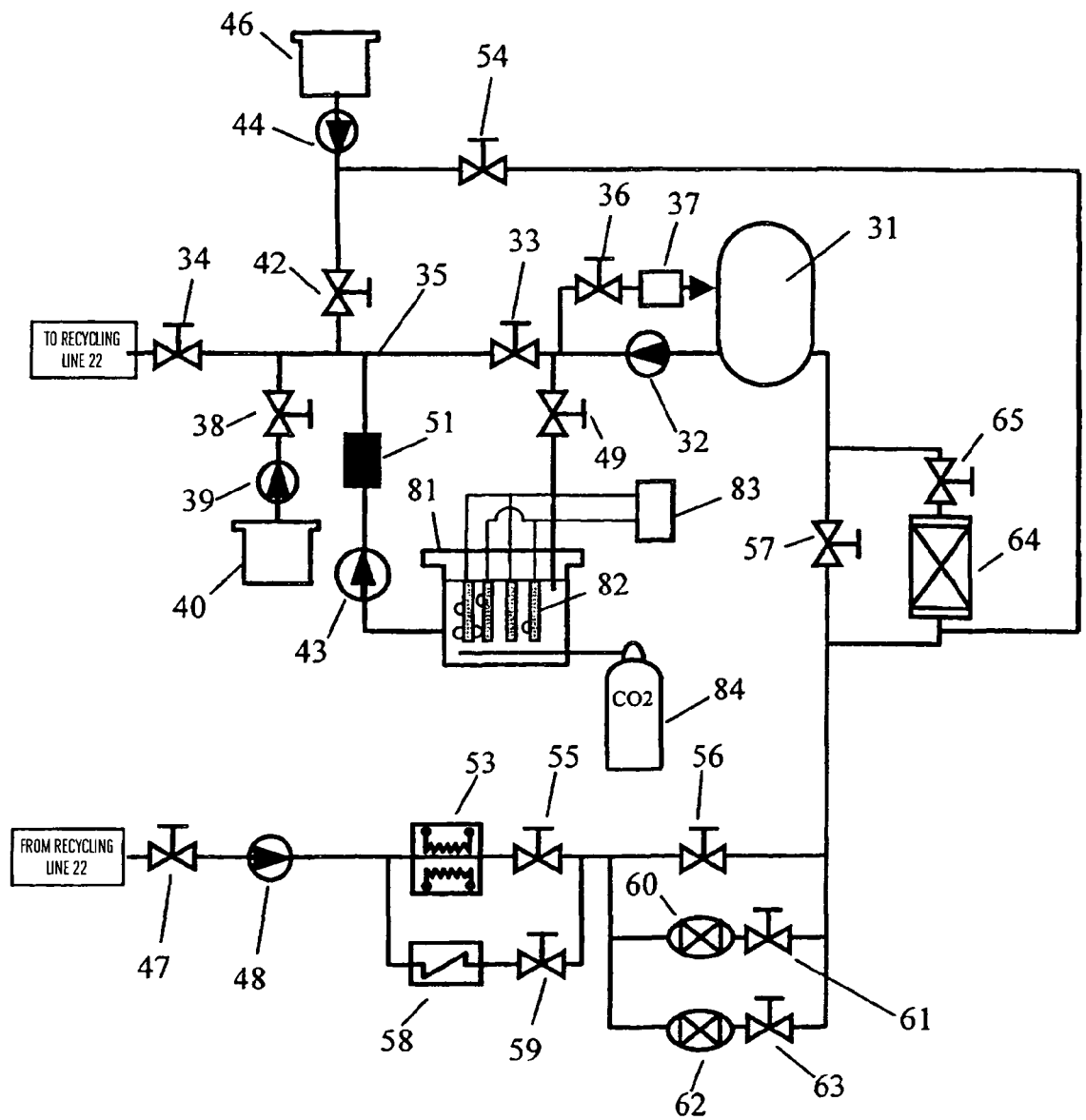
FIG. 12 illustrates the ferrite film formation apparatus structure of Example 4.

FIG. 12 illustrates a system schematic of Example 4. The system of the embodiment of Example 4 has basically the same devices and arrangements as that of the embodiment of Example 1 illustrated in FIG. 7, except that the agent tank 45 for holding the first agent is replaced by the electrolysis tank 81, which produces the iron (II) ions for forming the ferrite film wherein the iron (II) ions are eluted from the iron plate 82 (metallic iron electrode) when the current from the DC current source 83 provided in the tank 81 is supplied. The treatment solution containing the iron (II) ion is sent by the injection pump 43 to the treatment solution line 35 via the filter 51.

The electrolysis tank 81 is preferably provided with the carbon dioxide gas supply unit 84 to bubble water in the tank with carbon dioxide gas in order to increase water conductivity for electrolysis to facilitate flow of electrolysis current.

The electrolysis tank 81 is preferably provided with the filter 51 on the outlet side of it to remove fine metallic particles generated by altering electrolysis polarity.

The merits of the system of this embodiment can efficiently supply the iron (II) ions produced by a compact electrolysis tank, otherwise a large-size agent tank 45 is normally required because of low solubility of the ion. In addition, this system can simplify waste treatment because of the use of carbon dioxide gas.

Example 5

Figure 13:
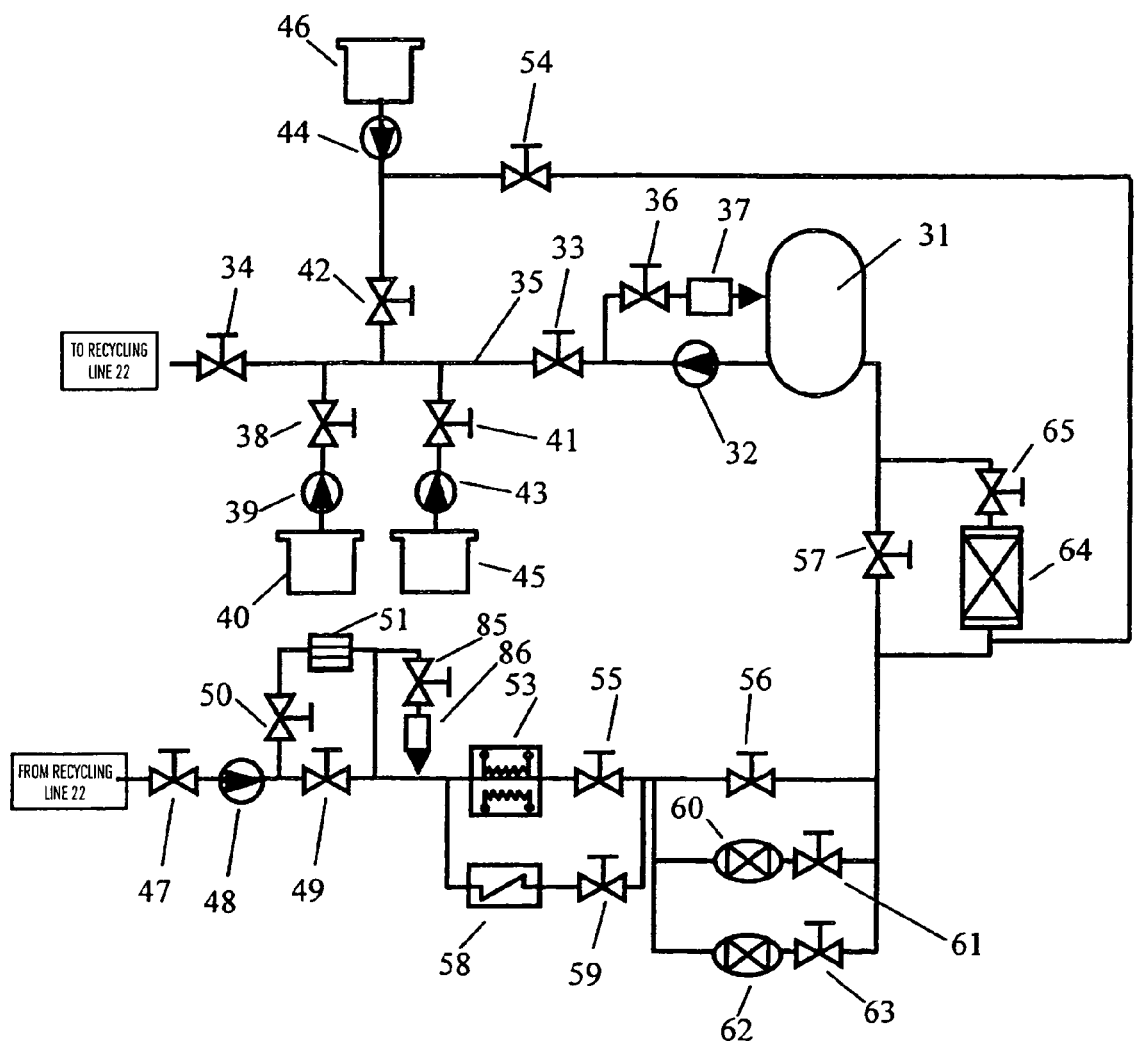
FIG. 13 illustrates the ferrite film formation apparatus structure of Example 5.

FIG. 13 illustrates a system schematic of Example 5.

The system of the embodiment of Example 5 has basically the same devices and their arrangement as that of the embodiment of Example 1 illustrated in FIG. 7, except that a chromatographic analyzer is provided ahead of a line branching off from downstream side of the filter 51 to measure the concentration of iron (II) ions in the treatment solution.

Figure 14:
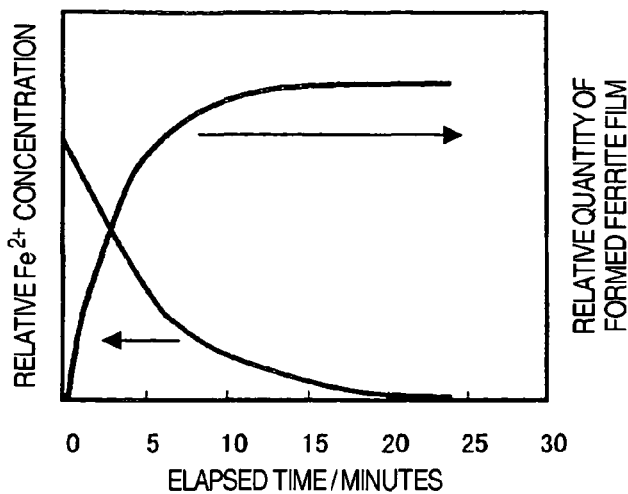
FIG. 14 shows the relationship between the relative quantities of the formed ferrite films and the relative iron (II) ion concentration in the treatment solution.

FIG. 14 plots the iron (II) ion concentration and formed film quantity against time elapsed after the treatment solution is mixed with each of the agents. Growth of the ferrite film saturates in about 2 hours after the agents are mixed, at which the iron (II) ions concentration is about one-sixth of the initial level. This shows that extent of the formation of the ferrite film can be estimated from the iron (II) ion concentration.

Figure 15:
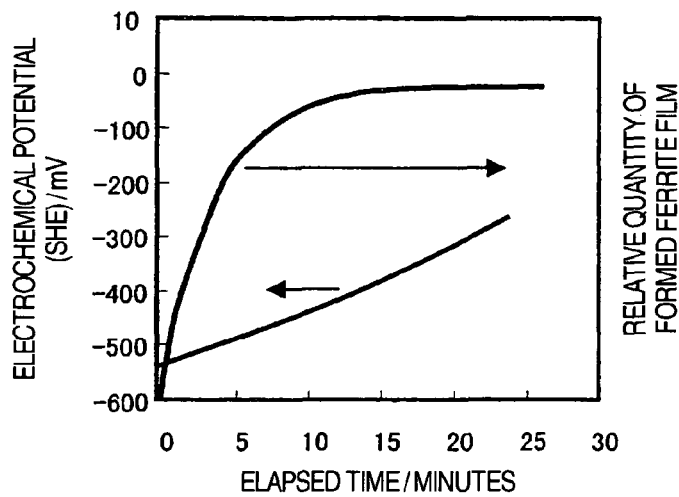
FIG. 15 shows the relationship between the relative quantities of the formed ferrite films and the electrochemical potential of platinum electrode.

The chromatographic analyzer for measuring the iron (II) ion concentration, shown in FIG. 13, may be replaced by a potentiometer with a platinum electrode. FIG. 15 plots the electrochemical potential of platinum electrode and formed film quantity against time elapsed after the treatment solution is mixed with each of the agents. Growth of the ferrite film saturates in about 2 hours after the agents are mixed, at which the electrochemical potential of platinum electrode is about −400 mV. This shows that extent of the formation of the ferrite film can be estimated from the electrochemical potential of platinum electrode.

Example 6

Figure 16:
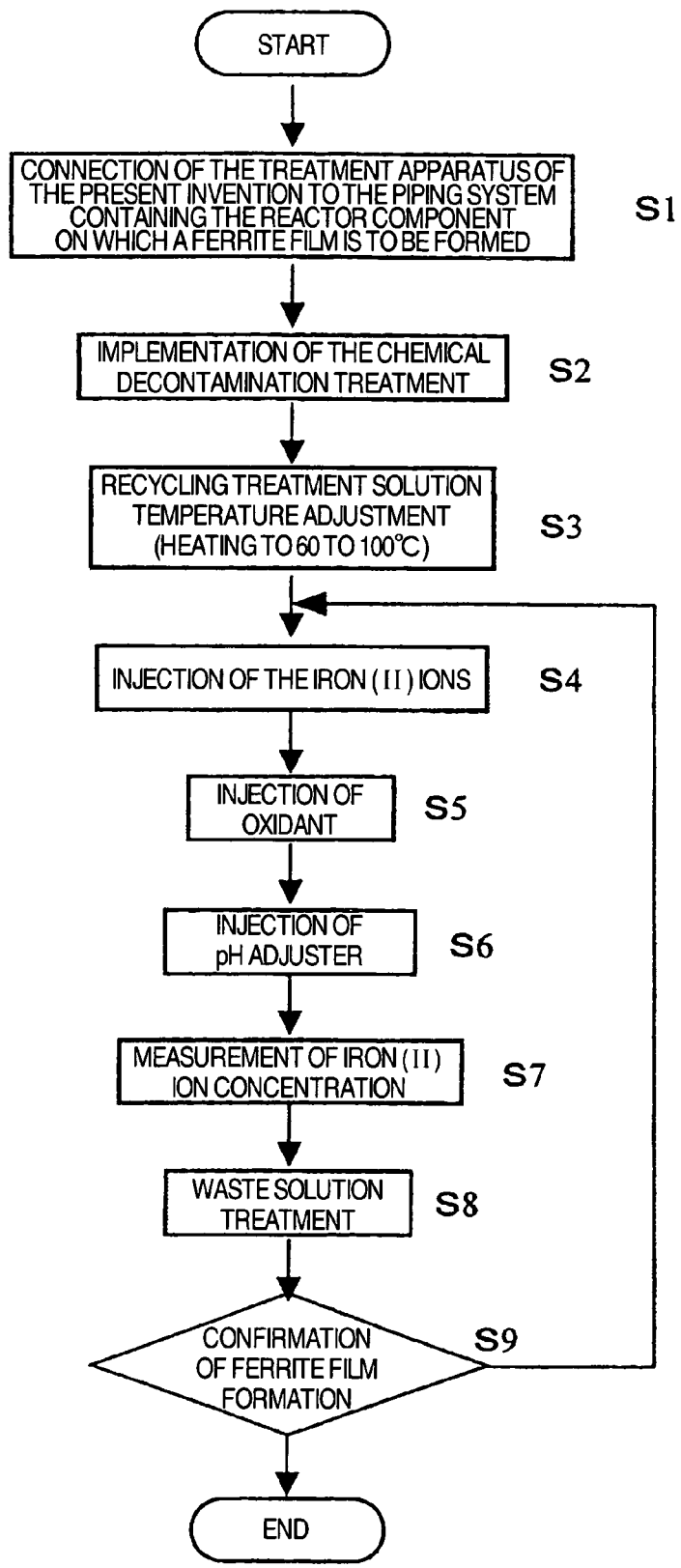
FIG. 16 illustrates a flow chart of another embodiment of the suppression method of the radio nuclide deposition of the present invention.

FIG. 16 illustrates a flow chart of the procedure of Example 6. In Example 1, the treatment for the formation of the ferrite film is repeated with each agent further added in the used treatment solution when the formation of the ferrite film is insufficient. The procedure of Example 6 differs from Example 1 in that the used solution is replaced by the fresh with repeated the formation of the ferrite film.

Figure 17:
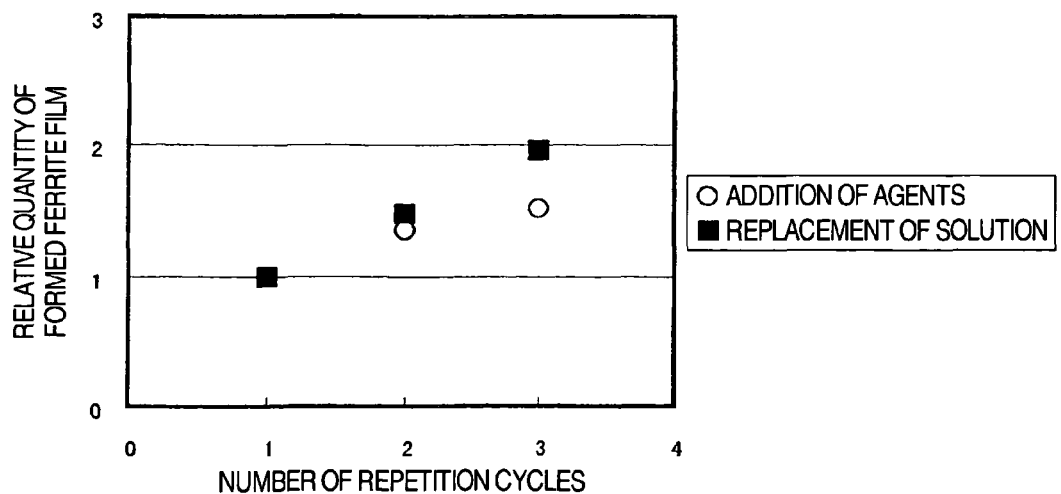
FIG. 17 illustrates the comparison of the relative quantities of the ferrite film formed by the method of adding fresh agents to the treatment solution and the method of exchanging the treatment solution.

This procedure performs ferrite film formation at a higher efficiency. More specifically, FIG. 17 compares the results between Example 6 and Example 1. As shown therein, the procedure of Example 6 exhibits a higher efficiency of the ferrite film formation when the film formation treatment steps are repeated.

In this method, since there exists a large quantity of the reaction solution, it will be difficult to commercially replace them. However, the treatment solution which is again added each agent after being treated by the decomposition unit 64 to decompose formic acid and hydrazine can produce the effect similar to the case of the replacement of the treatment solution.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

The present invention provides a method for efficiently suppressing radionuclide deposition on a reactor component of nuclear power plant, and a reactor component and ferrite film formation apparatus.

The invention claimed is:

1. A method for suppressing radionuclide deposition on a metallic reactor component of a nuclear power plant comprising the steps of:
   connecting a pipe having a pump pressurizing a treatment solution to a piping, which is made of stainless steel and is the metallic reactor component, during a time that the nuclear power plant is stopped;
   adding a first agent containing iron (II) ions, a second agent for oxidizing the iron (II) ions to iron (III) ions, and a third agent for adjusting a pH, in this order, into the pipe;
   supplying the treatment solution containing the first, second and third agents and adjusting a pH to within 5.5-9.0 by the addition of the third agent into the piping through the pipe;
   adsorbing the iron (II) ions on an inner surface of the piping by contacting the treatment solution with the inner surface of the piping; and
   forming a ferrite film on the inner surface of the piping by oxidizing the adsorbed iron (II) ions through an oxidation action of the second agent, during the time that the nuclear power plant is stopped.

2. A method for suppressing radionuclide deposition on a metallic reactor component of a nuclear power plant according to claim 1, wherein the third agent is mixed in a nuclear reactor containment vessel.

3. A method for suppressing radionuclide deposition on a metallic reactor component of a nuclear power plant according to claim 1, wherein the first agent is an aqueous formic acid solution dissolving metallic iron.

4. A method for suppressing radionuclide deposition on a metallic reactor component of a nuclear power plant according to claim 1, wherein the first agent is an aqueous formic acid solution dissolving iron (II) formate.

5. A method for suppressing radionuclide deposition on a metallic reactor component of a nuclear power plant according to claim 1, wherein the first agent is a solution containing the iron (II) ions eluted from a metallic iron electrode by electrolysis.

6. A method for suppressing radionuclide deposition on a metallic reactor component of a nuclear power plant according to claim 1, wherein the second agent is hydrogen peroxide.

7. A method for suppressing radionuclide deposition on a metallic reactor component of a nuclear power plant according to claim 1, wherein the third agent is hydrazine.

8. A method for suppressing radionuclide deposition on a metallic reactor component of a nuclear power plant according to claim 1, wherein the ratio of hydrogen peroxide concentration in the second agent to iron (II) ion concentration in the first agent is ¼ or less.

9. A method for suppressing radionuclide deposition on a metallic reactor component of a nuclear power plant according to claim 1, wherein the first agent and the treatment solution are bubbled with an inert gas.

10. A method for suppressing radionuclide deposition on a metallic reactor component of a nuclear power plant according to claim 1, wherein the metallic reactor component is supplied with the treatment solution by a 2 line system, each line being alternately carried out in a fill and drain manner to form the ferrite film.

11. A method for suppressing radionuclide deposition on a metallic reactor component of a nuclear power plant according to claim 1, wherein the ferrite film is formed after radionuclide contaminants which include an oxide film deposited on the metallic reactor component are removed.

12. A method for suppressing radionuclide deposition on a metallic reactor component of a nuclear power plant according to claim 11, wherein the radionuclide contaminants are removed by chemical decontamination which repeats oxidative removing and reductive removing alternately.

13. A method for suppressing radionuclide deposition on a metallic reactor component of a nuclear power plant according to claim 1, wherein the ferrite film is formed at 60° C. to 100° C.

14. A method for suppressing radionuclide deposition on a metallic reactor component of a nuclear power plant according to claim 12, wherein the ferrite film is formed after the decontamination step for removing the radionuclides contaminants from the metallic reactor component is completed and before the nuclear power plant is started up.

15. A method for suppressing radionuclide deposition on a metallic reactor component of a nuclear power plant according to claim 1, wherein a vapor phase is purged with an inert gas when a free liquid surface is present on the reactor component on which the ferrite film is to be formed.

16. A method for suppressing radionuclide deposition on a metallic reactor component of a nuclear power plant according to claim 1, wherein the agent components are decomposed into a substance in the form of gas at normal temperature and pressure and water after the ferrite films is formed.

17. A method for suppressing radionuclide deposition on a metallic reactor component of a nuclear power plant according to claim 16, wherein the ferrite film is formed after the agent components are decomposed into the substance in the form of gas at normal temperature and pressure and water and water.

18. A method for suppressing radionuclide deposition on a metallic reactor component of a nuclear power plant according to claim 1, wherein agent components included in the treatment solution are decomposed after the ferrite film is formed.

19. A method for suppressing radionuclide deposition on a metallic reactor component of a nuclear power plant according to claim 1, wherein the ferrite film is formed at 20° C. to 200° C.

20. A method for suppressing radionuclide deposition on a metallic reactor component of a nuclear power plant, comprising the steps of:
connecting a pipe having a pump pressurizing a treatment solution, a first addition apparatus of a first agent containing iron (II) ions, a second addition apparatus of a second agent for oxidizing the iron (II) ions to iron (III) ions, and a third addition apparatus of a third agent for adjusting a pH, to a piping, which is made of stainless steel and is the metallic reactor component, during a time that the nuclear power plant is stopped;
adding the first agent by the first addition apparatus, the second agent by the second addition apparatus, and the third agent by the third addition apparatus, in this order, into the pipe;
supplying the treatment solution containing the first, second and third agents and adjusting a pH to within 5.5-9.0 by the addition of the third agent into the piping, during the time that the nuclear power plant is stopped;
adsorbing the iron (II) ions on an inner surface of the piping, which is the piping, by contacting the treatment solution with the inner surface of the piping; and
forming a ferrite film on the inner surface of the piping by oxidizing the adsorbed iron (II) ions through an oxidation action of the second agent, during the time that the nuclear power plant is stopped.

21. The method for suppressing radionuclide deposition on a metallic reactor component of a nuclear power plant according to claim 20,
wherein the treatment solution is circulated through the piping and the pipe both ends of which are connected to the piping.

22. The method for suppressing radionuclide deposition on a metallic reactor component of a nuclear power plant according to claim 20,
wherein the first, second and third agents are the treatment solution in the pipe.

23. The method for suppressing radionuclide deposition on a metallic reactor component of nuclear power plant according to claim 21,
wherein the first, second and third agents are the treatment solution in the pipe.

* * * * *